United States Patent
Li et al.

(10) Patent No.: US 8,822,369 B2
(45) Date of Patent: Sep. 2, 2014

(54) METHOD FOR PRODUCING HYDROCARBON-PRODUCING CATALYST, HYDROCARBON-PRODUCING CATALYST, AND METHOD FOR PRODUCING HYDROCARBON

(75) Inventors: Xiaohong Li, Kitakyushu (JP); Hisashi Yuuda, Kitakyushu (JP)

(73) Assignee: Kitakyushu Foundation for the Advancement of Industry, Science and Technology, Kitakyushi-shi (JP)

( * ) Notice: Subject to any disclaimer, the term of this patent is extended or adjusted under 35 U.S.C. 154(b) by 447 days.

(21) Appl. No.: 13/130,882

(22) PCT Filed: Nov. 27, 2009

(86) PCT No.: PCT/JP2009/006421
§ 371 (c)(1), (2), (4) Date: May 24, 2011

(87) PCT Pub. No.: WO2010/061623
PCT Pub. Date: Jun. 3, 2010

(65) Prior Publication Data
US 2011/0230574 A1    Sep. 22, 2011

(30) Foreign Application Priority Data

Nov. 28, 2008  (JP) .................... 2008-304254

(51) Int. Cl.
| | | |
|---|---|---|
| *C07C 1/20* | (2006.01) | |
| *B01J 37/02* | (2006.01) | |
| *B01J 23/75* | (2006.01) | |
| *B01J 35/02* | (2006.01) | |
| *B01J 21/08* | (2006.01) | |
| *B01J 35/00* | (2006.01) | |
| *C10G 2/00* | (2006.01) | |
| *B01J 37/03* | (2006.01) | |

(52) U.S. Cl.
CPC .............. *B01J 23/75* (2013.01); *B01J 37/0209* (2013.01); *B01J 21/08* (2013.01); *B01J 35/008* (2013.01); *B01J 37/0232* (2013.01); *C10G 2/332* (2013.01); *B01J 37/0213* (2013.01); *B01J 37/0221* (2013.01); *B01J 37/036* (2013.01); *C10G 2/33* (2013.01); *B01J 37/0211* (2013.01)
USPC ............ 502/300; 518/715; 502/325; 502/260

(58) Field of Classification Search
USPC ........................................................ 502/300
See application file for complete search history.

(56) References Cited

U.S. PATENT DOCUMENTS

| | | | |
|---|---|---|---|
| 4,962,078 A | 10/1990 | Behrmann et al. | |
| 4,977,126 A | 12/1990 | Mauldin et al. | |
| 5,030,608 A * | 7/1991 | Schubert et al. | ............. 502/300 |
| 5,128,377 A | 7/1992 | Behrmann et al. | |
| 5,545,674 A | 8/1996 | Behrmann et al. | |
| RE37,406 E | 10/2001 | Behrmann et al. | |
| 6,319,960 B1 | 11/2001 | Behrmann et al. | |

FOREIGN PATENT DOCUMENTS

| | | |
|---|---|---|
| JP | 63 147545 | 6/1988 |
| JP | 2997778 | 11/1999 |
| JP | 2007 260669 | 10/2007 |
| JP | 2007 270049 | 10/2007 |
| JP | 2008 239878 | 10/2008 |

OTHER PUBLICATIONS

Li, Xiaohong; et al. "Koseino FT Gosei-yo Shokubai no Sekkei." DAI 100 KAI Shokubai Toronkai Toronkai A Yokoshu, vol. 100$^{th}$, p. 107 (Sep. 17, 2007).

International Search Report issued Mar. 9, 2010 in PCT/JP09/06421 filed Nov. 27, 2009.

* cited by examiner

Primary Examiner — Melvin C Mayes
Assistant Examiner — Douglas Call
(74) Attorney, Agent, or Firm — Oblon, Spivak, McClelland, Maier & Neustadt, L.L.P.

(57) ABSTRACT

The present invention relates to a method for producing a hydrocarbon-producing catalyst for producing a hydrocarbon from a mixed gas of carbon monoxide and hydrogen and provides a method for producing, with stability and at high productivity, a hydrocarbon-producing catalyst with which the rate of conversion of carbon monoxide to hydrocarbon is high, the methane selectivity is low, the high activity can be maintained over a long period, the desorption of the active metal is unlikely to occur, and the durability is excellent. The method includes a precursor film forming step of putting a sol solution of an active metal compound and a metal oxide precursor in contact with a heated catalyst carrier 2 to form a precursor film on a surface of the catalyst carrier 2, and a hydrolysis step of gelling the precursor film by hydrolysis to form a metal oxide gel film 4, with the active metal 6 dispersed uniformly, on the surface of the catalyst carrier 2.

4 Claims, 5 Drawing Sheets

METHOD FOR PRODUCING HYDROCARBON-PRODUCING CATALYST, HYDROCARBON-PRODUCING CATALYST, AND METHOD FOR PRODUCING HYDROCARBON

TECHNICAL FIELD

The present invention relates to a method for producing a hydrocarbon-producing catalyst for producing a hydrocarbon from carbon monoxide, the hydrocarbon-producing catalyst, and a method for producing hydrocarbon.

BACKGROUND ART

Natural gas is said to be present in recoverable reserves that surpass those of crude oil in energy equivalent terms, is low in heteroelement content and thus clean in comparison to other fossil fuel resources, and is thus a resource that is anticipated for effective utilization. For utilization of such a natural gas resource, it is effective to convert methane, which is a main component of natural gas, to gasoline, diesel oil, or other liquid fuel to significantly reduce transport costs. As a realistic synthesis method for converting methane to a liquid fuel, the Fischer Tropsch synthesis (hereinafter referred to as "FT synthesis") with which a synthesis gas (mixed gas of carbon monoxide and hydrogen) produced via a reforming reaction is converted to a liquid hydrocarbon, etc., (the FT synthesis reaction is generally expressed as: $nCO+2nH_2 \rightarrow (CH_2)n+nH_2O$) is known. In order to improve hydrocarbon productivity, a catalyst of high rate of conversion of carbon monoxide to hydrocarbon is required in FT synthesis, and various catalysts and methods for production thereof have been developed.

As a conventional art, a "catalyst with which active metal species of cobalt metal and a noble metal are carried on a catalyst carrier having silica as a main component" is disclosed in (Patent Literature 1). Also, a method for producing a hydrocarbon-producing catalyst disclosed in (Patent Literature 1) is that in which "a cobalt compound and a noble metal compound are made to be carried on the catalyst carrier by an impregnation method, an incipient wetness method, or a precipitation method."

A "catalyst including at least one type of element selected from among platinum group elements and rhenium and made of a cobalt-carrying material produced by a sol-gel method" is disclosed in (Patent Literature 2).

A "catalyst with which zirconium and either or both of cobalt and ruthenium are carried on a metal oxide (carrier) and no less than 75% of a total amount of the zirconium, etc., is carried within ⅕ of a radius directed from an outer surface to a center of the catalyst" is disclosed in (Patent Literature 3). Also, in a method for producing catalyst disclosed in (Patent Literature 3) the catalyst is produced by "spray-impregnating a precursor solution of a metal onto a carrier at 50 to 350° C. while stirring the carrier."

CITATION LIST

Patent Literatures

PTL 1: Japanese Published Unexamined Patent Application No. 2007-260669
PTL 2: Japanese Patent No. 2997778
PTL 3: Japanese Published Unexamined Patent Application No. 2008-239878

SUMMARY OF INVENTION

Technical Problem

However, the above conventional arts have the following issues.

(1) With the impregnation method, incipient wetness method, and precipitation method disclosed in (Patent Literature 1), a precursor solution of active metal species of cobalt and the noble metal enters inside pores present on a surface of the catalyst carrier so that a catalyst is prepared with which the active metal species are aggregated and bound to internal surfaces of the pores as well. There is an issue that the active metal species bound to the interior of the catalyst not only is unlikely to contribute to a reduction reaction but also causes a secondary reaction and leads to generation of methane (increases (worsens) methane selectivity). In FT synthesis, a hydrocarbon is synthesized using the synthesis gas (synthesis gas of carbon monoxide and hydrogen), generated by reforming reaction of natural gas, as the raw material, and a method for producing hydrocarbon of excellent productivity that reduces the methane selectivity in FT synthesis and reduces the amount of methane returned as an unreacted part to the raw material side is demanded because the main component of the natural gas is methane.

(2) By the impregnation method, incipient wetness method, and precipitation method disclosed in (Patent Literature 1), the catalyst in which the precursor solution of the active metal species of cobalt and the noble metal are also bound to the interior of the catalyst carrier is prepared. In the FT synthesis reaction, a high proportion of the reaction is carried out by the active metal species on an outer surface of the catalyst carrier, and thus the active metal species present in the interior do not function effectively as the FT synthesis catalyst and are low in utilization efficiency and uneconomical.

(3) The catalyst disclosed in (Patent Literature 2) is a glass-like solid that contains cobalt uniformly (paragraph 0008) and cobalt is present not only on the surface but also in a solid interior. The cobalt present in the solid interior does not function effectively as the FT synthesis catalyst and is thus low in utilization efficiency and uneconomical. There is also an issue that the cobalt that is not exposed at the outer surface of the catalyst not only is unlikely to contribute to the reduction reaction but also causes a secondary reaction and leads to generation of methane (increases (worsens) the methane selectivity). Also, in FT synthesis, the hydrocarbon is synthesized using the synthesis gas (synthesis gas of carbon monoxide and hydrogen), generated by the reforming reaction of natural gas, as the raw material, and a method for producing hydrocarbon at excellent productivity that reduces the methane selectivity of FT synthesis and reduces the amount of methane returned as an unreacted part to the raw material side is demanded because the main component of the natural gas is methane. In an example (paragraph 0015) of Patent Literature 2, a catalyst is described with which a rate of conversion of carbon monoxide to hydrocarbon 4 hours after start of reaction is 55%, and although improvement of yield can be achieved by returning an unreacted part (45%) to the raw material side and making it react repeatedly, development of a hydrocarbon-producing catalyst with which the rate of conversion of carbon monoxide to hydrocarbon is further improved is demanded for improvement of productivity.

(4) The hydrocarbon-producing catalyst disclosed in (Patent Literature 3) is produced by "spray-impregnating a precursor solution of an active metal onto a catalyst carrier at 50 to 350° C. while stirring the catalyst carrier" and thus the precursor solution of the active metal that contacts the catalyst carrier evaporates immediately on a surface of the catalyst carrier, and the precursor solution of active metal is thus unlikely to enter into pores and cobalt or ruthenium (active metal species) that is the active metal is unlikely to bind to internal surface of the pores. Thus unlike with the hydrocarbon-producing catalyst disclosed in Patent Literature 1, the problem of the active metal species bound to the internal surfaces of the pores causing a secondary reaction and leading to generation of methane (increasing (worsening) the methane selectivity) is unlikely to occur. However, such a so-called egg-shell type catalyst in which the active metal is fixed to the surface of the catalyst carrier has an issue that oxidative deactivation and elution of the active metal species fixed to the catalyst carrier surface tend to occur due to influences of reaction heat of FT synthesis and by-produced water (water resistance is low). Also with the egg-shell type catalyst, there is an issue that catalyst activity tends to degrade in a short time because the active metal species tends to aggregate on catalyst carrier surface portions besides the pores due to sintering by the reaction heat and thereby coarsen, decrease in specific surface area, and decrease in active points.

(5) The hydrocarbon-producing catalyst disclosed in (Patent Literature 3) is low in binding force of the catalyst carrier and the active metal species and thus has an issue of being poor in durability due to the active metal species desorbing readily from the catalyst carrier due to contact of catalysts with each other during the FT synthesis reaction and thermal expansion difference between the catalyst carrier and the active metal species.

The present invention resolves the above issues of the conventional arts and an object thereof is to provide a method for producing a hydrocarbon-producing catalyst by which a gel film made of a metal oxide, and an active metal uniformly dispersed inside the gel film, are localized on an outer surface of a catalyst carrier so that consequently, a catalyst that is high in a rate of conversion of carbon monoxide to hydrocarbon, is low in methane selectivity, is capable of maintaining catalyst activity over a long period, is unlikely to undergo desorption of the active metal, and is excellent in durability can be produced with stability at high productivity.

Another object of the present invention is to provide a hydrocarbon-producing catalyst that is high in the rate of conversion of carbon monoxide to hydrocarbon, is low in methane selectivity, is capable of maintaining catalyst activity over a long period, is unlikely to undergo desorption of the active metal, and is excellent in durability.

Also, in FT synthesis, a hydrocarbon is synthesized using a synthesis gas (synthesis gas of carbon monoxide and hydrogen), generated by reforming reaction of natural gas, as a raw material. A main component of the natural gas is methane, and thus yet another object of the present invention is to provide a method for producing hydrocarbon that can reduce methane selectivity, can reduce an amount of methane returned as an unreacted part to a raw material side, and is excellent in productivity.

Solution to Problem

To resolve the above issues of the conventional arts, a method for producing a hydrocarbon-producing catalyst, the hydrocarbon-producing catalyst, and a method for producing hydrocarbon according to the present invention have the following structures.

A method for producing a hydrocarbon-producing catalyst according to a first aspect of the present invention has a structure that includes a precursor film forming step of putting a sol solution of an active metal compound and a metal oxide precursor in contact with a heated catalyst carrier to form a precursor film on a surface of the catalyst carrier, and a hydrolysis step of gelling the precursor film by hydrolysis to form a metal oxide gel film, with the active metal dispersed uniformly, on the surface of the catalyst carrier.

The present structure provides the following actions.

(1) The sol solution of the active metal compound and the metal oxide precursor is put in contact with the heated catalyst carrier, and thus a precursor film made of the active metal compound and the metal oxide precursor can be formed on the surface of the catalyst carrier by evaporation of a solvent while allowing hardly any of the sol solution of the active metal compound and the metal oxide precursor put in contact with the surface of the catalyst carrier to enter inside pores in the surface of the catalyst carrier and binding of the active metal to an interior of the catalyst carrier can be prevented. The active metal compound and the metal oxide precursor to be contacted with the catalyst carrier are prepared as a sol and the active metal can thus be more localized without non-uniformity on the surface of the catalyst carrier in comparison to a conventional egg-shell type catalyst and an amount of the active metal bound to interiors of the pores can be lessened. Consequently, causing a secondary reaction and generation of methane (increase (worsening) of methane selectivity) due to active metal bound to the interiors of the catalyst carrier can be prevented, and a hydrocarbon-producing catalyst of low methane selectivity and high hydrocarbon yield can be produced with high productivity. At the same time, the active metal is localized on the surface of the catalyst carrier without non-uniformity, consequently the produced hydrocarbon desorbs immediately from the surface of the hydrocarbon-producing catalyst and by-production of carbonaceous matter is unlikely to occur.

(2) An active metal carrying catalyst with which a microscopically fine active metal is reductively precipitated on the catalyst carrier surface can be obtained because the active metal is encapsulated at an atomic level inside a lattice of the metal oxide by the metal oxide gel film with the active metal dispersed uniformly being formed on the surface of the catalyst carrier by gelling of the sol-form precursor film, made of the active metal compound and the metal oxide, by hydrolysis, and a hydrocarbon-producing catalyst of high rate of conversion of carbon monoxide to hydrocarbon and high activity can be produced because a proportion of an FT synthesis reaction that occurs on the surface of the catalyst carrier is high.

(3) With the metal oxide gel film with the active metal dispersed uniformly, the metal oxide is present in between the active metal and thus even if a reaction heat of FT synthesis is applied, lowering of catalyst activity, which was an issue with the conventional egg-shell type catalyst, is suppressed and a hydrocarbon-producing catalyst capable of maintaining high activity over a long period can be produced because aggregation of the active metal by sintering is suppressed so that coarsening of the active metal is unlikely to occur and a specific surface area for the FT synthesis reaction can be maintained.

(4) A hydrogen-producing catalyst that is excellent in water resistance, is unlikely to give rise to oxidative deactivation and elution of the active metal even upon receiving influences of the reaction heat of FT synthesis and by-produced water, and is capable of maintaining high activity over a long period can be produced because the active metal is uniformly dispersed in the gel film made of the metal oxide and the metal oxide and the active metal are bound together.

(5) A hydrogen-producing catalyst of excellent durability with which a binding strength between the active metal and the catalyst carrier is high and the active metal is unlikely to desorb from the catalyst carrier even when catalysts contact each other during the FT synthesis reaction can be produced because the catalyst carrier and the active metal are bound via the gel film made of the metal oxide.

Here, as the catalyst carrier, a hydrocarbon-insoluble substance that is generally used in actual apparatuses in petroleum refining and petrochemistry may be used without any particular restrictions. Metal oxides, such as silica, alumina, titania, magnesia, zirconia, etc., can be cited as examples. Although there are no restrictions in particular regarding a shape of the catalyst carrier, in light of practicality, a spherical shape, columnar shape, or trefoil shape, etc., which is generally used in actual apparatuses in petroleum refining and petrochemistry, may be used.

Although a catalyst carrier with an average particle diameter of 10 µm to 10 mm may be used, in particular, a particle diameter of 0.5 mm to 5 mm and more preferably 1 mm to 3 mm is suitable. By using the catalyst carrier with an average particle diameter of 1 to 3 mm, a hydrocarbon-producing catalyst of high rate of conversion of carbon monoxide to hydrocarbon can be obtained with stability. As the particle diameter of the catalyst carrier decreases below 1 mm, a heat capacity of each individual catalyst carrier decreases so that the catalyst carrier becomes easily cooled by the sol solution of the active metal compound and the metal oxide precursor contacted with the heated catalyst carrier, an evaporation rate of the sol solution contacted with the catalyst carrier is slowed, and the sol solution more readily impregnates the catalyst carrier, and thus properties tend to approach those of a catalyst prepared by the conventional impregnation method, the rate of conversion of carbon monoxide to hydrocarbon of the hydrocarbon-producing catalyst obtained tends to decrease, and these tendencies become significant when the particle diameter decreases below 0.5 mm. Also, as the particle diameter of the catalyst carrier increases above 3 mm, the specific surface area of the catalyst carrier decreases and the rate of conversion of carbon monoxide to hydrocarbon tends to decrease, and this tendency becomes significant when the particle diameter increases above 5 mm.

As the metal oxide precursor, any compound having a group that can bind with the surface of the catalyst carrier, is converted to a metal oxide by hydrolysis, and changes from a sol to a gel by hydrolysis may be used without any restriction in particular.

Although silicon (Si) is not a metal in terms of material physics (non-metal), with the present invention, silicon compounds, such as silane compounds, etc., shall also be included among the metal oxide precursors.

Metal alkoxides, such as a titanium butoxide ($Ti(O-nBu)_4$), zirconiumpropoxide ($Zr(O-nPr)_4$), aluminumbutoxide ($Al(O-nBu)_3$), niobium butoxide ($Nb(O-nBu)_5$), etc.; metal alkoxides having two or more alkoxyl groups, such as a methyltrimethoxysilane ($MeSi(O-Me)_3$), diethyldiethoxysilane ($Et_2Si(O-Et)_2$), tetraethoxysilane ($Si(O-Et)_4$), etc.; metal alkoxides having a ligand of acetylacetone, etc., and having two or more alkoxyl groups; and metal alkoxides that are double alkoxide compounds, such as $BaTi(OR)_x$, etc.; can be cited as specific examples.

These metal alkoxides are preferable in forming microparticles of an alkoxide gel upon undergoing partial hydrolysis and condensation by addition of a small amount of water. Also, binuclear or cluster-type alkoxide compounds having a plurality or a plurality of types of metal elements, such as titanium butoxide tetramer ($C_4H_9O[Ti(OC_4H_9)_2O]_4C_4H_9$), etc., as well as compounds (for example, $TiCl_4$, etc.,) that form a metal alkoxide upon being dissolved in a suitable solvent, and furthermore compounds (for example, $Si(OCN)_4$, etc.,) that contain a metal and oxygen and cause a sol-gel reaction in a solvent may be used.

Also, a metal complex that chemically adsorbs to a hydroxyl group on the surface of the catalyst carrier and gives rise to a new hydroxyl group on the surface by hydrolysis may also be used as the metal oxide precursor. Specifically as such a metal complex, a metal halide, a metal carbonyl compound, such as iron pentacarbonyl ($Fe(CO)_5$), etc., and multinuclear clusters of the above may also be used.

Such a metal oxide precursor is used solitarily or two or more types are used upon mixing. The metal species of the catalyst carrier and the metal oxide precursor may differ. This is because after the metal oxide precursor becomes chemically or physically adsorbed to the surface of the catalyst carrier, the surface of the catalyst carrier and the gel film formed of the metal oxide become chemically bonded due to hydrolysis regardless of the metal species.

Among the metal oxide precursors, a metal alkoxide is favorable due to excellent handling properties.

As the active metal of the active metal compound, cobalt, iron, etc., which are normally used as a catalyst for FT synthesis, may be used. Ruthenium, platinum group elements, and other noble metals may also be used.

As the active metal compound, a salt or a complex of an active metal may be used, and nitrates, hydrochloride, formates, propionates, acetates, etc., can be cited as examples.

As the solution of the active metal compound and the metal oxide precursor, that with which the active metal compound and the metal oxide precursor are dissolved uniformly in a solvent is used. Heating to approximately 50 to 70° C. may be performed to increase solubility.

As the solvent, any solvent capable of dissolving the active metal compound and the metal oxide precursor uniformly may be used without any restriction in particular. Univalent alcohols, such as methyl alcohol, ethyl alcohol, propanol, etc., polyvalent alcohols, such as ethylene glycol, etc., and organic solvents, such as tetrahydrofuran, chloroform, acetone, etc., can be cited as examples. In particular, ethylene glycol or other polyvalent alcohol that is unlikely to be rate-determining in the hydrolysis reaction and is easy to handle is favorable.

0.05 to 1 mole of the metal oxide precursor per 1 mole of the active metal compound is favorable. As the metal oxide precursor becomes less than 0.05 moles, the activity per unit weight of the catalyst tends to be inadequate, and as the precursor becomes greater than 1 mole, the metal oxide becomes excessive and the active metal tends to desorb readily from the catalyst carrier.

In the precursor film forming step, a dipping method, spraying method, spinning method, etc., may be used as a means for putting the sol solution of the active metal compound and the metal oxide precursor in contact with the catalyst carrier.

Not only may the sol solution of the active metal compound and the metal oxide precursor be put in contact with the catalyst carrier in a liquid state, but the solution of the active metal compound and the metal oxide precursor in a vapor state may also be put in contact with the catalyst carrier and be formed as a sol film on the catalyst carrier surface. A method for putting the solution of the active metal compound and the metal oxide precursor in a vapor state is not determined in particular and a known method may be employed. For example, a vapor state may be generated by blowing an inert gas while maintaining the solution at a temperature no more than a boiling point to move and put the solution in contact with the surface of the catalyst carrier. Nitrogen gas, argon gas, helium, etc., can be cited as examples of the inert gas.

50 to 350° C. and preferably 100 to 250° C. is favorable as the heating temperature of the catalyst carrier in the precursor film forming step. As the heating temperature decreases below 100° C., the solution tends to impregnate the interiors of the pores readily due to slow vaporization rate of the solution, and as the heating temperature increases above 250° C., the evaporation rate of the solution tends to be high, the metal oxide precursor and the active metal tend to be less likely to be adsorbed to the catalyst carrier, and a catalyst of high activity tends to be less readily obtained. In particular, both a temperature below 50° C. and a temperature above 350° C. are unfavorable because the above tendencies become significant.

Preferably, heating is performed in a state where the catalyst carrier is fluidized by stirring, etc. This is done to put the solution in contact with catalyst carrier uniformly.

In the hydrolysis step, the metal oxide gel film with the active metal dispersed uniformly can be formed by hydrolyzing and thereby polycondensing and gelling the precursor film. For the hydrolysis, a known method may be employed without any restriction in particular as long as the metal oxide precursor can be converted to the metal oxide. For example, a method of exposing the catalyst carrier, having the precursor film formed thereon, to air containing water vapor, hot air drying method of blowing hot air onto the catalyst carrier, having the precursor film formed thereon, etc., may be used.

When the catalyst carrier is heated in advance in a case where water is contained in the sol solution of the active metal compound and the metal oxide precursor, spraying of the sol solution of the active metal compound and the metal oxide precursor onto the catalyst carrier results in the metal oxide precursor film formed on the surface of the catalyst carrier undergoing hydrolysis and gelling immediately to become the metal oxide gel film with the active metal dispersed uniformly.

After the hydrolysis, the surface of the catalyst carrier may be dried using a dry gas, such as nitrogen gas, etc., as necessary. Also, heating to a temperature of 60 to 200° C. may be performed during hydrolysis or after hydrolysis. This is done to evaporate the solution before the solution enters into the pores in the surface of the catalyst carrier. Further, the time required for these processes can be shortened by using a base or other condensation catalyst.

Furthermore, after the hydrolysis step, unnecessary solvent, etc., must be removed by baking in air. The activity of the catalyst can also be increased by baking. 200 to 550° C. is favorable as a baking temperature, and 1 to 5 hours is favorable as a baking time. As the baking temperature falls below 200° C., removal of the metal oxide precursor, the solvent, and other organic matter, etc., tends to be inadequate and improvement of the catalyst activity tends to be difficult, and as the baking temperature rises above 550° C., precipitation/ aggregation of active metal particles and, depending on the type of the catalyst carrier, decrease of specific surface area due to aggregation of the catalyst carrier by sintering tend to occur and the catalyst activity tends to decrease, and thus both cases are unfavorable.

5 to 50 mass % and more preferably 10 to 40 mass % is favorable as a carrying rate of the active metal on the hydrocarbon-producing catalyst (proportion of the mass of the carried active metal with respect to the entire mass of the catalyst). As the carrying rate decreases below 10 mass %, the catalyst activity tends to decrease, and as the carrying rate increases above 40 mass %, a dispersion property of the active metal in the metal oxide gel film with the active metal dispersed uniformly tends to decrease and make the active metal decrease in utilization efficiency and become uneconomical. Both a carrying rate less than 5 mass % and a carrying rate greater than 50 mass % are unfavorable as the above tendencies become significant.

Although depending on the type of catalyst carrier, a reduction treatment at a temperature of 150 to 550° C. is performed to activate the catalyst in producing the hydrocarbon. The reduction treatment may be performed inside a hydrogen gas flow. As the treatment temperature falls below 150° C., improvement of the catalyst activity tends to be difficult, and as the treatment temperature rises above 550° C., precipitation and aggregation of active metal particles occur in some cases and the catalyst activity tends to decrease, and thus both cases are unfavorable.

A catalyst carrier surface processing step of impregnating the catalyst carrier surface with a sol solution of the metal oxide precursor and performing hydrolysis by adding water and then heating and drying may be provided before the precursor film forming step.

By this structure, the following actions are provided.

(1) The surface area is increased by roughening of the carrier surface, thereby enabling forming of a metal oxide gel film with active metal dispersed uniformly of wider area and enabling obtaining of a hydrocarbon-producing catalyst of higher catalyst activity per weight and per volume.

(2) The metal oxide gel film with the active metal dispersed uniformly binds with the rough surface structure of the catalyst carrier and thus the metal oxide gel film with the active metal dispersed uniformly is higher in strength and a hydrocarbon-producing catalyst of high wear resistance and impact resistance can be obtained.

A second aspect of the present invention provides the method for producing a hydrocarbon-producing catalyst according to the first aspect having a structure where a molar ratio of the active metal with respect to the metal oxide (active metal/metal oxide) in the metal oxide gel film with the active metal dispersed uniformly is 1.5 to 2.4.

By this structure, the following actions are provided in addition to the actions provided by the first aspect.

(1) When the molar ratio of the active metal with respect to the metal oxide (active metal/metal oxide) in the metal oxide gel film with the active metal dispersed uniformly is in the range of 1.5 to 2.4, the active metal dispersed in the metal oxide gel film undergoes reductive precipitation readily, thereby enabling realization of high activity and obtaining of a hydrocarbon-producing catalyst of high rate of conversion of carbon monoxide to hydrocarbon and low decrease of activity with time.

(2) Unlike in Japanese Patent No. 2997778 (Patent Literature 2), the active metal, such as cobalt, iron, etc., can be reduced and high catalyst activity can be expressed without having to contain a noble metal, such as ruthenium or a platinum group element, etc. Cobalt and iron are low in cost compared to ruthenium and platinum group elements and are stable in terms of supply of resource, etc., and thus a highly active hydrocarbon-producing catalyst can be produced at low cost and with stability by the present invention with which a noble metal is not essential in the raw material.

Here, as the molar ratio of the active metal with respect to the metal oxide (active metal/metal oxide) in the metal oxide gel film with the active metal dispersed uniformly decreases below 1.5, the active metal tends to be less likely to undergo reductive precipitation and the rate of conversion of carbon monoxide to hydrocarbon tends to decrease, and as the ratio increases above 2.4, the rate of conversion of carbon monoxide to hydrocarbon tends not to improve even when the carried amount of the active metal increases so that the carried active metal tends to decrease in utilization efficiency and become uneconomical and the degree of decrease of activity with time tends to increase, and thus both cases are unfavorable.

A third aspect of the present invention provides the method for producing a hydrocarbon-producing catalyst according to the first or second aspect having a structure where the active metal is cobalt.

By this structure, the following action is provided in addition to the actions provided by the first or second aspect.

(1) By carrying cobalt as the active metal, a highly active hydrocarbon-producing catalyst with a rate of conversion of carbon monoxide to hydrocarbon of no less than 70% can be produced.

A hydrocarbon-producing catalyst according to a fourth aspect of the present invention has a structure that includes a metal oxide gel film with an active metal dispersed uniformly that is formed on a surface of a catalyst carrier by hydrolysis of a metal oxide precursor and where no less than 75% of a total amount of the active metal is localized within $1/10$ (at an outer surface side) and more preferably $1/20$ (at an outer surface side) of a radius directed from an outer surface to a center of the hydrocarbon-producing catalyst.

The following actions are provided by this structure.

(1) Causing a secondary reaction and generation of methane (increase (worsening) of methane selectivity) due to active metal bound to interiors of pores of the catalyst carrier can be prevented, the methane selectivity can be decreased, and the hydrocarbon yield can be increased because no less than 75% of the total amount of the active metal is localized within $1/10$ (at an outer surface side) and more preferably $1/20$ (at an outer surface side) of the radius directed from the outer surface to the center of the hydrocarbon-producing catalyst.

(2) An active metal carrying catalyst with which a microscopically fine active metal is reductively precipitated on the catalyst carrier surface can be obtained because the active metal is encapsulated at the atomic level inside the lattice of the metal oxide by the forming of the metal oxide gel film with the active metal dispersed uniformly on the surface of the catalyst carrier, and a hydrocarbon-producing catalyst of a high rate of conversion of carbon monoxide to hydrocarbon and high activity can be produced because the proportion of the FT synthesis reaction that occurs on the surface of the catalyst carrier is high. Also, the catalyst has a structure where the metal oxide is present in between the uniformly dispersed active metal and thus even if a reaction heat of FT synthesis is applied, aggregation of the active metal by sintering is suppressed so that coarsening of the active metal is unlikely to occur, the specific surface area for the FT synthesis reaction can be maintained, and a high activity can be maintained over a long period.

(3) Water resistance is excellent, oxidative deactivation and elution of the active metal are unlikely to occur even upon receiving influences of the reaction heat of FT synthesis and by-produced water, and high activity can be maintained over a long period because the active metal is uniformly dispersed in the gel film made of the metal oxide.

(4) The binding strength between the active metal and the catalyst carrier is high, the active metal is unlikely to desorb from the catalyst carrier even when catalysts contact each other during the FT synthesis reaction, and durability is excellent because the catalyst carrier and the active metal are bound via the gel film made of the metal oxide.

(5) The hydrocarbon that is produced desorbs immediately from the surface of the hydrocarbon-producing catalyst and by-production of carbonaceous matter is unlikely to occur because the active metal is localized without non-uniformity on the surface of catalyst carrier.

Here, the metal oxide precursor, the catalyst carrier, the metal oxide gel film with the active metal dispersed uniformly, and the active metal are the same as those described with the first aspect, and description thereof shall thus be omitted.

The numerical value of no less than 75% of the total amount of the active metal being localized within $1/10$ (at an outer surface side) and more preferably $1/20$ (at an outer surface side) of the radius directed from the outer surface to the center of the hydrocarbon-producing catalyst was determined by the inventors from results of electron probe microanalysis (EPMA) measurements of catalyst cross sections, and decrease to below 75% of the amount of the active metal localized within $1/10$ (at an outer surface side) of the radius directed from the outer surface to the center of the hydrocarbon-producing catalyst indicates that the amount of active metal bound to the interiors of the pores of the catalyst carrier has increased or the metal oxide gel film is formed thickly, and this is unfavorable because carbon monoxide tends to be less likely to contact the active metal bound to the interiors of the pores and the active metal bound to deep portions of the metal oxide gel film, the methane selectivity tends to increase (worsen) due to the produced hydrocarbon being less readily desorbed from the active metal, and the rate of conversion of carbon monoxide to hydrocarbon tends to decrease.

The distance of $1/20$ to $1/10$ (at an outer surface side) of the radius directed toward the center is considered to indicate a thickness of the metal oxide gel film with the active metal dispersed uniformly. With the hydrocarbon-producing catalyst, the amount of active metal that is carried (carrying rate) is generally fixed in a range of 15 to 20 mass %, and the thickness of the metal oxide gel film with the active metal dispersed uniformly thus changes according to the molar ratio of the active metal and the metal oxide. With the hydrocarbon-producing catalyst that exhibits good activity, the molar ratio of the active metal (Co) with respect to the metal oxide ($SiO_2$) (active metal/metal oxide=$Co/SiO_2$) in the active metal carrying gel film is 1.5 to 2.4, and in this case, the actually measured film thickness of the metal oxide gel film with the active metal dispersed uniformly is $1/20$ to $1/10$ (at an outer surface side) of the radius directed toward the center.

On the other hand, thinning of the thickness of the metal oxide gel film with the active metal dispersed uniformly beyond $1/20$ of the radius directed toward the center is not very favorable in that the metal oxide between the active metal decreases and the binding of the active metal and the catalyst carrier tends to weaken. Also, thickening to more than $1/10$ is not favorable in that the active metal buried in the interior of the metal oxide gel film tends to be less likely to undergo reductive precipitation and the activity tends to decrease, and carbon monoxide tends to be less likely to contact the active metal bound to deep internal portions of the metal oxide gel film, the methane selectivity tends to increase (worsen) due to the produced hydrocarbon being less readily desorbed from the active metal, and the rate of conversion of carbon monoxide to hydrocarbon tends to decrease.

A fifth aspect of the present invention provides the hydrocarbon-producing catalyst according to the fourth aspect having a structure where cobalt is uniformly dispersed as the active metal in the metal oxide gel film made of silica.

By this structure, the following action is provided in addition to the actions provided by the fourth aspect.

(1) By making cobalt be uniformly dispersed as the active metal in the metal oxide gel film made of silica and be localized on the catalyst carrier surface, the durability is made excellent and a high activity with a rate of conversion of carbon monoxide to hydrocarbon being no less than 70% is realized.

A method for producing hydrocarbon according to a sixth aspect of the present invention has a structure where carbon monoxide and hydrogen are reacted under the presence of the hydrocarbon-producing catalyst obtained by the production method according to any one of the first to third aspects or the hydrocarbon-producing catalyst according to the fourth or fifth aspect.

The following action is provided by this structure.

(1) An amount of methane to be returned as an unreacted part to a raw material side can be decreased in a hydrocarbon production process and a hydrocarbon can be produced with high productivity because the rate of conversion of carbon monoxide to hydrocarbon of the hydrocarbon-producing catalyst is high and the methane selectivity is low.

Here, the reaction of carbon monoxide and hydrogen may be carried out in any of gas-phase fixed beds, fluidized beds, and fluidized suspension beds (slurry beds). Normal FT synthesis conditions may be applied as reaction conditions.

For example, 170 to 320° C. and preferably 180 to 250° C. is favorable as a reaction temperature. As the reaction temperature decreases below 180° C., a reaction rate of carbon monoxide tends to decrease and the hydrocarbon yield tends to decrease, and as the reaction temperature increases above 250° C., production amounts of gases, such as methane, tend to increase. Both a reaction temperature lower than 170° C. and a reaction temperature higher than 320° C. are unfavorable because the above tendencies become significant.

Although there are no restrictions in particular concerning a gas hourly space velocity for the hydrocarbon-producing catalyst, normally, 500 to 4000 $h^{-1}$ and preferably 1000 to 3000 $h^{-1}$ is favorable. As the gas hourly space velocity decreases below 1000 $h^{-1}$, the productivity of hydrocarbon tends to decrease, and as the gas hourly space velocity increases above 3000 $h^{-1}$, the gas production amount tends to increase with increasing the reaction temperature. In particular, both a gas hourly space velocity less than 500 $h^{-1}$ and gas hourly space velocity greater than 4000 $h^{-1}$ are unfavorable because the above tendencies become significant.

Although W/F (ratio of the mass (g) of the hydrocarbon-producing catalyst and the gas hourly space velocity (mol/h)) may be set as suited, 1 to 100 is preferable. The gas may be diluted with an inert gas, etc., in carrying out the reaction.

Although there are no particular restrictions regarding reaction pressure (partial pressure of synthesis gas of carbon monoxide and hydrogen), 0.5 to 7 MPa and preferably 2 to 4 MPa are favorable. As the reaction pressure decreases below 2 MPa, the rate of conversion of carbon monoxide to hydrocarbon tends to decrease, and as the reaction pressure increases above 4 MPa, equipment investment cost tends to increase. In particular, both a reaction pressure lower than 0.5 MPa and a reaction pressure higher than 7 MPa are unfavorable because the above tendencies become significant.

Although the raw material is not restricted in particular as long as it is a synthesis gas having carbon monoxide and hydrogen as main components, normally, a molar ratio of hydrogen/carbon monoxide is in a range of 1.2 to 3.0 and preferably 1.8 to 2.2. As this molar ratio decreases below 1.8, the carbon monoxide conversion rate tends to decrease, and as the molar ratio increases above 2.2, a chain growth probability tends to decrease and obtaining of a higher hydrocarbon tends to become difficult. In particular, both a molar ratio less than 1.2 and a molar ratio greater than 3.0 are unfavorable because these tendencies become significant.

The chain growth probability is the chain growth probability in a Schulz-Flory distribution (Angew. Chem. Int. Ed. Engl., 15, 136 (1976), etc.,) and is the probability $\alpha$ that a hydrocarbon intermediate with a carbon number n increases in carbon number by one and becomes an intermediate with a carbon number n+1. It is expressed as: chain growth probability $\alpha=rP/(rP+rT)$. Here, rP is a rate by which the intermediate of carbon number n becomes an intermediate of carbon number n+1 and rT is a rate by which the intermediate of carbon number n desorbs (stops) as it is without increasing in carbon number.

Advantageous Effects of Invention

As described above, by the method for producing a hydrocarbon-producing catalyst, the hydrocarbon-producing catalyst, and the method for producing hydrocarbon according to the present invention, the following beneficial effects are provided.

By the first aspect of the invention, the following effects are provided.

(1) A production method can be provided by which the gel film made of the metal oxide and the active metal that is uniformly dispersed inside the gel film can be localized on the outer surface of the catalyst carrier and consequently, causing a secondary reaction and generation of methane (increase (worsening) of the methane selectivity) due to active metal bound to the interiors of pores of the catalyst carrier can be prevented and a hydrocarbon-producing catalyst that is low in methane selectivity and high in hydrocarbon yield can be produced with high productivity.

(2) A production method can be provided by which an active metal carrying catalyst having a microscopically fine active metal reductively precipitated on the catalyst carrier surface can be provided and a hydrocarbon-producing catalyst of high rate of conversion of carbon monoxide to hydrocarbon and high activity can be provided.

(3) A production method that enables obtaining of a hydrocarbon-producing catalyst capable of maintaining a high activity over a long period can be provided because with the metal oxide gel film with the active metal dispersed uniformly, the metal oxide is present in between the active metal and thus aggregation of the active metal by sintering is suppressed, thereby making coarsening of the active metal unlikely to occur and enabling the specific surface area for reaction to be maintained.

(4) A production method that enables obtaining of a hydrogen-producing catalyst, which is excellent in water resistance, is unlikely to give rise to oxidative deactivation and elution of the active metal even upon receiving influences of the reaction heat of FT synthesis and by-produced water, and is capable of maintaining high activity over a long period, can be provided because the active metal is uniformly dispersed in the gel film made of the metal oxide, the metal oxide is present in between the active metal, and the metal oxide and the active metal are bound together.

(5) A production method capable of producing a hydrogen-producing catalyst of excellent durability, with which the binding strength between the active metal and the catalyst carrier is high and the active metal is unlikely to desorb from the catalyst carrier even when catalysts contact each other during the FT synthesis reaction, can be provided because the catalyst carrier and the active metal are bound via the gel film made of the metal oxide.

By the second aspect of the invention, the following effects are provided in addition to the effects of the first aspect.

(1) A production method that enables obtaining of a hydrocarbon-producing catalyst, which can realize a high activity due to the active metal, dispersed in the metal oxide gel film with the active metal dispersed uniformly, undergoing reductive precipitation readily, is high in the rate of conversion of carbon monoxide to hydrocarbon, and is low in the decrease of activity with time, can be provided.

(2) A method for producing a hydrocarbon-producing catalyst can be provided by which the highly active catalyst can be produced at low cost and with stability because a noble metal is not essential in the raw material.

By the third aspect of the invention, the following effect is provided in addition to the effects of the first or second aspect.

(1) A production method can be provided by which a hydrocarbon-producing catalyst of high activity with the rate of conversion of carbon monoxide to hydrocarbon being no less than 70% can be obtained by making cobalt be carried as the active metal.

By the fourth aspect of the invention, the following effects are provided.

(1) A hydrocarbon-producing catalyst, with which causing a secondary reaction and generation of methane (increase (worsening) of methane selectivity) due to active metal bound to the interiors of the pores of the catalyst carrier can be prevented, the methane selectivity is low, and the hydrocarbon yield is high, can be provided.

(2) A metal carrying catalyst with which a microscopically fine active metal is reductively precipitated on the catalyst carrier surface can be obtained, and a hydrocarbon-producing catalyst of a high rate of conversion of carbon monoxide to hydrocarbon and high activity can be provided. Also, a hydrocarbon-producing catalyst, with which aggregation of the active metal by sintering is suppressed, coarsening of the active metal is unlikely to occur, the specific surface area for the FT synthesis reaction can be maintained, and a high activity can be maintained over a long period can be provided because of the structure where the metal oxide is present in between the uniformly dispersed active metal.

(3) A hydrocarbon-producing catalyst, which is excellent in water resistance and with which oxidative deactivation and elution of the active metal are unlikely to occur even upon receiving influences of the reaction heat of FT synthesis and by-produced water, and high activity can be maintained over a long period, can be provided because the active metal is uniformly dispersed in the gel film made of the metal oxide.

(4) A hydrocarbon-producing catalyst can be provided with which the binding strength between the active metal and the catalyst carrier is high, the active metal is unlikely to desorb from the catalyst carrier and durability is excellent because the catalyst carrier and the active metal are bound via the gel film made of the metal oxide.

By the fifth aspect of the invention, the following effect is provided in addition to the effects of the fourth aspect.

(1) A hydrocarbon-producing catalyst of high durability and high activity with the rate of conversion of carbon monoxide to hydrocarbon being no less than 70% can be provided by uniformly dispersing cobalt as the active metal in the metal oxide gel film made of silica and localizing the cobalt at the catalyst carrier surface.

By the sixth aspect of the invention, the following effect is provided.

(1) A method for producing hydrocarbon of excellent productivity can be provided by which the amount of methane returned as the unreacted part to the raw material side can be reduced because the hydrocarbon-producing catalyst is high in the rate of conversion of carbon monoxide to hydrocarbon and low in methane selectivity.

A best mode for carrying out the present invention shall now be described with reference to the drawings.

Embodiment 1

Figure 1:
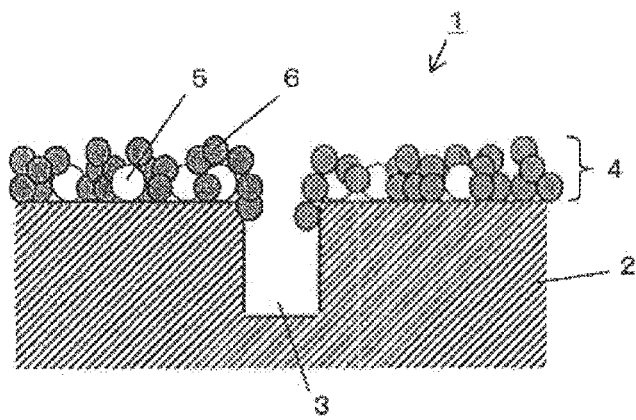
FIG. 1 is an enlarged schematic view showing a surface of hydrocarbon-producing catalyst of Embodiment 1.

FIG. 1 is an enlarged schematic view of a surface of hydrocarbon-producing catalyst obtained by a method for producing the hydrocarbon-producing catalyst of Embodiment 1 according to the present invention.

In FIG. 1, 1 is a hydrocarbon-producing catalyst according to the present invention, 2 is a catalyst carrier, which is made of a metal oxide, such as silica, alumina, titania, magnesia, zirconia, etc., is formed to a spherical form, cylindrical form, trefoil form, etc., and is insoluble in hydrocarbons and sol solutions, 3 is a pore that is present in plurality in a surface of the catalyst carrier 2, 4 is a metal oxide gel film with an active metal dispersed uniformly that is formed by hydrolysis of a metal oxide precursor 8, to be described later, on an outer surface of the catalyst carrier 2 excluding interiors of pores 3, 5 is a metal oxide present in the metal oxide gel film 4 with the active metal dispersed uniformly, and 6 is the active metal, which is cobalt, iron, a platinum group element, etc., that is uniformly dispersed in the metal oxide gel film 4 with the active metal dispersed uniformly.

In the present embodiment, no less than 75% of a total amount of the active metal 6 is localized and carried within $1/10$ (at an outer surface side) and more preferably $1/20$ (at an outer surface side) of a radius directed from the outer surface to a center of the hydrocarbon-producing catalyst 1.

A method for producing the hydrocarbon-producing catalyst 1 shall now be described with reference to the drawings.

Figure 2:
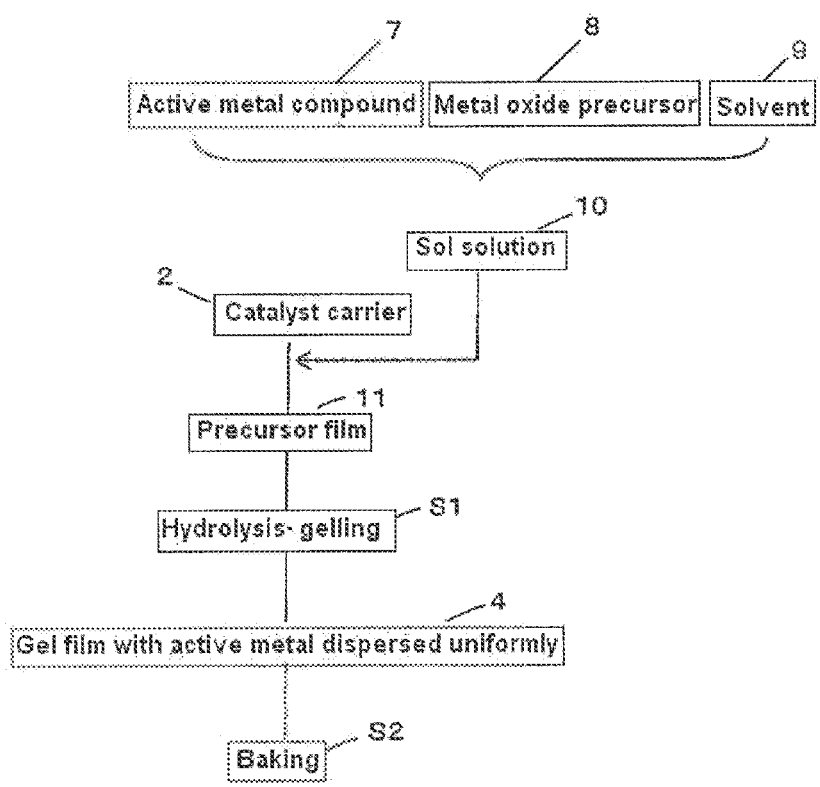
FIG. 2 is a flowchart of a method for producing a hydrocarbon-producing catalyst.

FIG. 2 is a flowchart of a method for producing the hydrocarbon-producing catalyst of Embodiment 1 according to the present invention.

First, an active metal compound 7, which is a salt or complex, etc., of the active metal 6, and the metal oxide precursor 8, which is tetramethyl silicate, zirconium tetrapropoxide, titanium tetrabutoxide, aluminum isopropoxide, trimethyl borate, or other metal alkoxide, etc., are uniformly dissolved in a solvent 9, which is a univalent alcohol, such as methyl alcohol, ethyl alcohol, propanol, etc., a polyvalent alcohol, such as ethylene glycol, etc., or an organic solvent, such as tetrahydrofuran, chloroform, acetone, etc., to obtain a sol solution 10.

The sol solution 10 is put in contact by a spin method, spray method, etc., with a surface of the catalyst carrier 2 that is heated to 50 to 350° C. to form a precursor film 11, with which the active metal compound 7 and the metal oxide precursor 8, are adsorbed to the surface of the catalyst carrier 2 (precursor film forming step).

Then in a hydrolysis step, the precursor film 11 is gelled by hydrolysis and polycondensation (S1) to form the metal oxide gel film 4 with the active metal 6 uniformly dispersed on the surface of the catalyst carrier 2.

By then baking in air at 200 to 550° C. in a baking step (S2), the hydrocarbon-producing catalyst of Embodiment 1 can be produced, and consequently, no less than 75% of the total amount of the active metal 6 can be localized and carried within 1/10 (at an outer surface side) and more preferably 1/20 (at an outer surface side) of the radius directed from the outer surface to the center of the hydrocarbon-producing catalyst.

By the method for producing a hydrocarbon-producing catalyst of Embodiment 1 according to the present invention described above, the following actions are provided.

(1) The sol solution 10 is put in contact with the heated catalyst carrier 2 and thus a precursor film 11, made of the active metal compound 7 and the metal oxide precursor 8, can be formed on the surface of the catalyst carrier 2 by evaporation of the solvent 9 while hardly any of the sol solution 10 put in contact with the surface of the catalyst carrier 2 enters into the pores 3, and impregnation and binding of the active metal 6 to the interiors of the pores 3 of the catalyst carrier 2 can be prevented. Consequently, causing a secondary reaction and generation of methane (increase (worsening) of methane selectivity) by the active metal 6 bound to the interiors of the pores 3 of the catalyst carrier 2 can be prevented, and the hydrocarbon-producing catalyst of low methane selectivity and high hydrocarbon yield can be produced with high productivity.

(2) An active metal carrying catalyst with which a microscopically fine active metal 6 is reductively precipitated on the surface of the catalyst carrier 2 can be obtained because the active metal 6 is encapsulated at the atomic level inside the lattice of the metal oxide 5 by the metal oxide gel film 4 with the active metal 6 dispersed uniformly being formed on the surface of the catalyst carrier 2 by gelling of the metal oxide precursor as the metal oxide gel film by hydrolysis of the precursor film 11, and a hydrocarbon-producing catalyst of a high rate of conversion of carbon monoxide to hydrocarbon and high activity can be produced. Further, the metal oxide 5 is present in between the active metal 6 and thus even if the reaction heat of FT synthesis is applied, aggregation of the active metal 6 by sintering is suppressed, coarsening of the active metal 6 is thus unlikely to occur, the specific surface area for the FT synthesis reaction can be maintained, and a hydrocarbon-producing catalyst capable of maintaining high activity over a long period can thus be produced.

(3) A hydrocarbon-producing catalyst that is excellent in water resistance, is unlikely to give rise to oxidative deactivation and elution of the active metal 6 even upon receiving influences of the reaction heat of FT synthesis and by-produced water, and is capable of maintaining high activity over a long period, can be produced because the active metal 6 is dispersed and held via the metal oxide 5 in the metal oxide gel film 4 with the active metal dispersed uniformly.

(4) A hydrocarbon-producing catalyst of excellent durability with which a binding strength between the active metal 6 and the catalyst carrier 2 is high and the active metal 6 is unlikely to desorb from the catalyst carrier 2 even when catalysts contact each other during the FT synthesis reaction can be produced because the catalyst carrier 2 and the active metal 6 are bound via the metal oxide 5.

Also, the hydrocarbon-producing catalyst in Embodiment 1 according to the present invention provides the following actions due to being arranged as described above.

(1) Causing a secondary reaction and generation of methane (increase (worsening) of methane selectivity) by the active metal 6 bound to the interior of the catalyst carrier 2 can be prevented, the methane selectivity can be decreased, and the hydrocarbon yield can be increased because no less than 75% of the total amount of the active metal 6 is localized and carried within 1/10 (at an outer surface side) and more preferably 1/20 (at an outer surface side) of the radius directed from the outer surface to the center of the hydrocarbon-producing catalyst.

(2) A metal carrying catalyst with which a microscopically fine active metal 6 is reductively precipitated on the surface of the catalyst carrier 2 can be obtained because the active metal 6 is encapsulated at the atomic level inside the lattice of the metal oxide 5 by the forming of the metal oxide gel film 4 with the active metal 6 dispersed uniformly on the surface of the catalyst carrier 2, and a catalyst of a high rate of conversion of carbon monoxide to hydrocarbon and high activity can be produced because the proportion of the FT synthesis reaction that occurs on the surface of the catalyst carrier 2 is high. Also, with the metal oxide gel film 4 with the active metal dispersed uniformly, the metal oxide 5 is present in between the active metal 6 and thus even if the reaction heat of FT synthesis is applied, aggregation of the active metal 6 by sintering is suppressed, coarsening of the active metal 6 is thus unlikely to occur, the specific surface area for the FT synthesis reaction can be maintained, and a high activity can be maintained over a long period.

(3) With the metal oxide gel film 4 with the active metal 6 dispersed uniformly, water resistance is excellent, oxidative deactivation and elution of the active metal 6 are unlikely to occur even upon receiving influences of the reaction heat of FT synthesis and by-produced water, and high activity can be maintained over a long period because the active metal 6 is dispersed and carried via the metal oxide 5.

(4) The binding strength between the active metal 6 and the catalyst carrier 2 is high, the active metal 6 is unlikely to desorb even when catalysts contact each other during the FT synthesis reaction, and durability is excellent because the catalyst carrier 2 and the active metal 6 are bound via the metal oxide 5.

The present invention shall now be described specifically by way of examples. However, the present invention is not restricted to these examples.

Example 1

8.72 g of a cobalt nitrate hexahydrate (made by Kanto Chemical Co., Inc.) were dissolved in 1.86 g of an ethylene glycol (made by Nacalai Tesque, Inc.), 3.12 g of a tetraethoxysilane (made by Nacalai Tesque, Inc.) and 1.08 g of distilled water were added, and stirring to a uniform state was performed at 60° C. to obtain a sol solution of the active metal compound and the metal oxide precursor.

10.00 g of a spherical silica (average pore diameter: 15 nm; average particle diameter: 1.75 mm; made by Fuji Silysia Chemical Ltd.) as the catalyst carrier were placed in a container including a stirrer blade at a bottom portion. While fluidizing the silica by rotating the stirrer blade, the container was heated to heat the silica to 150° C. 15 mL of the solution at room temperature were sprayed onto the fluid-state silica at 150° C. inside the container. The sol solution of the active metal compound and the metal oxide precursor contains water and thus by being sprayed onto the heated silica inside the container, the metal oxide precursor film formed on the silica surface immediately undergoes hydrolysis and gelling and becomes a metal oxide gel film with the active metal dispersed uniformly.

The silica was kept for 12 hours at 120° C. and, after evacuating and removing excess ethylene glycol, the silica was baked in an air stream for 1 hour at 200° C. to obtain a hydrocarbon-producing catalyst of Example 1.

With the hydrocarbon-producing catalyst of Example 1, a carrying rate of the active metal (cobalt) (proportion of the mass of the carried active metal with respect to the entire mass of the catalyst) was 15 mass %. Also, a molar ratio of the active metal (Co) with respect to the metal oxide ($SiO_2$) (active metal/metal oxide=Co/$SiO_2$) in the metal oxide gel film with the active metal dispersed uniformly was 2.0. These were quantified using fluorescence X rays.

Also, distribution and quantitative analyses of the active metal with respect to a radius direction of the catalyst were performed by electron probe microanalysis (EPMA), and a proportion of an active metal amount present within $1/10$ (at an outer surface side) of the radius directed from an outer surface to a center of the hydrocarbon-producing catalyst with respect to a total active metal amount was determined to be 98% and a proportion of the active metal amount present within $1/20$ (at an outer surface side) of the radius with respect to the total active metal amount was determined to be 90%.

Figure 3A:
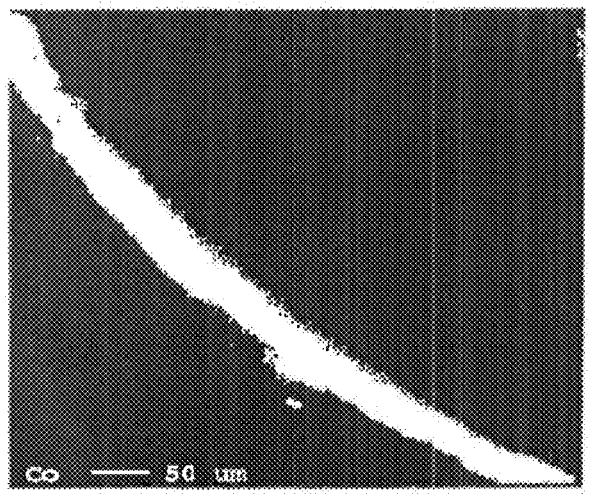
FIG. 3 shows electron probe microanalysis photographs of cross sections of hydrocarbon-producing catalysts of Example 1 and Comparative Examples 1 and 2, with FIG. 3A being a photograph of Example 1, FIG. 3B being that of Comparative Example 1, and FIG. 3C being that of Comparative Example 2.

FIG. 3A is an electron probe microanalysis photograph of the hydrocarbon-producing catalyst of Example 1. With the silica gel carrying catalyst (SEG catalyst) produced by the method according to the present invention, most of the active metal is localized within $1/10$ (at an outer surface side) of the radius directed from the outer surface to the center of the hydrocarbon-producing catalyst, and thus only that portion appears to shine.

Comparative Example 1

Distilled water was added to 12.8 g of a cobalt nitrate hexahydrate (made by Kanto Chemical Co., Inc.) to obtain 12 ml of an aqueous solution of cobalt nitrate. The cobalt nitrate aqueous solution was impregnated by the incipient wetness method into 10.0 g of same spherical silica (average pore diameter: 15 nm; average particle diameter: 1.75 mm) as the catalyst carrier as in Example 1, and after drying for 12 hours at 120° C., baking in an air stream for 1 hour at 200° C. was performed to obtain a hydrocarbon-producing catalyst of Comparative Example 1.

Comparative Example 1 is based on the method disclosed in Patent Literature 1. Also, the carrying rate of the active metal (cobalt) of the hydrocarbon-producing catalyst of Comparative Example 1 was 20 mass %. It is known that generally with the incipient wetness method or the impregnation method, a rate of conversion of carbon monoxide to hydrocarbon is low, and the carrying rate was set to 20% because an active metal carrying rate of 15% is not suitable for the Comparative Example.

Also, distribution and quantitative analyses of the active metal with respect to a radius direction of the catalyst were performed by electron probe microanalysis (EPMA), and the proportion of the active metal amount present within $1/10$ (at an outer surface side) of the radius directed from the outer surface to the center of the hydrocarbon-producing catalyst with respect to the total active metal amount was determined to be 43%.

Figure 3B:
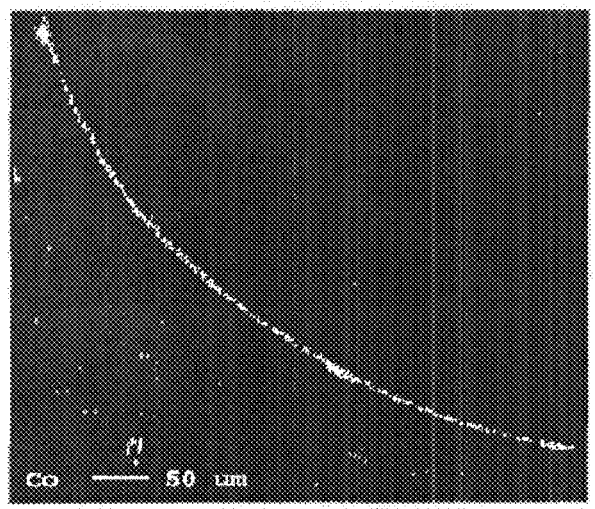

FIG. 3B is an electron probe microanalysis photograph of the hydrocarbon-producing catalyst of Comparative Example 1. There is no difference in the amount of active metal present across the entirety of the interior, and thus the entire interior appears black. This shows that with the hydrocarbon-producing catalyst produced by the impregnation method of Comparative Example 1, the active metal is permeated throughout the entire interior of the carrier and is not localized.

Comparative Example 2

8.72 g of a cobalt nitrate hexahydrate (made by Kanto Chemical Co., Inc.) were dissolved in 10 ml of ethanol to obtain an ethanol solution of cobalt nitrate.

10.00 g of the same spherical silica (average pore diameter: 15 nm; average particle diameter: 1.75 mm) as in Example 1 were placed as the catalyst carrier in a container including a stirrer blade at a bottom portion. While fluidizing the silica by rotating the stirrer blade, the container was heated to heat the silica to 200° C. 15 mL of the ethanol solution at 25° C. were sprayed onto the fluid-state silica at 200° C. inside the container.

The silica was kept for 12 hours at 120° C. to dry and was thereafter baked in an air stream for 1 hour at 200° C. to obtain a hydrocarbon-producing catalyst of Comparative Example 2.

Comparative Example 2 is based on the method disclosed in Patent Literature 3. Also, the carrying rate of the active metal (cobalt) of the hydrocarbon-producing catalyst of Comparative Example 2 was 15 mass %.

Also, distribution and quantitative analyses of the active metal with respect to the radius direction of the catalyst were performed by electron probe microanalysis (EPMA), and the proportion of the active metal amount present within $1/10$ (at an outer surface side) of the radius directed from the outer surface to the center of the hydrocarbon-producing catalyst with respect to the total active metal amount was determined to be 88% and the proportion of the active metal amount present within $1/20$ (at an outer surface side) of the radius with respect to the total active metal amount was determined to be 82%.

Figure 3C:
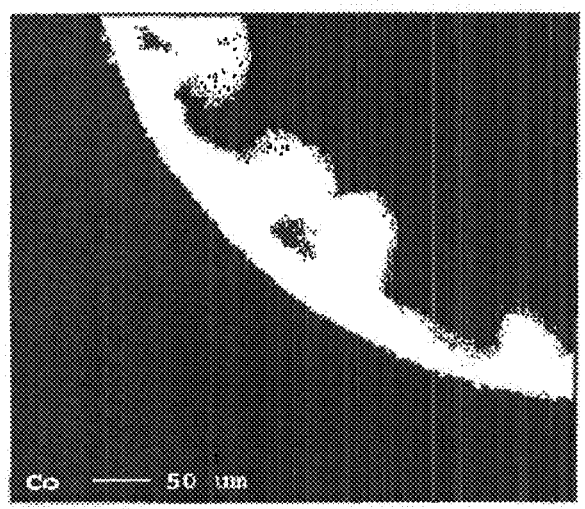

FIG. 3C is an electron probe microanalysis photograph of the hydrocarbon-producing catalyst of Comparative Example 2. The photograph shows that with the egg-shell type hydrocarbon-producing catalyst of Comparative Example 2, although the active metal is localized close to the outer surface of the catalyst carrier, the active metal penetrates to a depth exceeding $1/10$ (at an outer surface side) of the radius directed from the outer surface to the center of the carrier.

Example 2

A fixed bed flow reactor was packed with 1 g of the hydrocarbon-producing catalyst of Example 1. Before reaction, a reduction treatment under a hydrogen gas flow was performed for 3 hours at 400° C. A raw material mixed gas with a hydrogen/carbon monoxide ratio of 2/1 (molar ratio) was supplied at a condition of W/F (ratio of mass (g) of catalyst and gas hourly space velocity (mol/h))=5, and a reaction was carried out under conditions of a reaction temperature of 230° C. and a reaction column internal pressure of 1 MPa. At each raw material mixed gas supplying time, a gas composition at a reaction portion exit and a product oil were analyzed by gas chromatography, and a carbon monoxide conversion rate was computed by a routine method. Also, methane selectivity was computed from a rate of conversion to methane and the rate of conversion of carbon monoxide to hydrocarbon.

Reaction of the raw material mixed gas under the same conditions, analysis of the gas composition at the reaction portion exit and the product oil by gas chromatography at each raw material mixed gas supplying time, and computation of the carbon monoxide conversion rate and the methane selectivity were performed for the hydrocarbon-producing catalysts of Comparative Example 1 and Comparative Example 2 as well.

Figure 4:
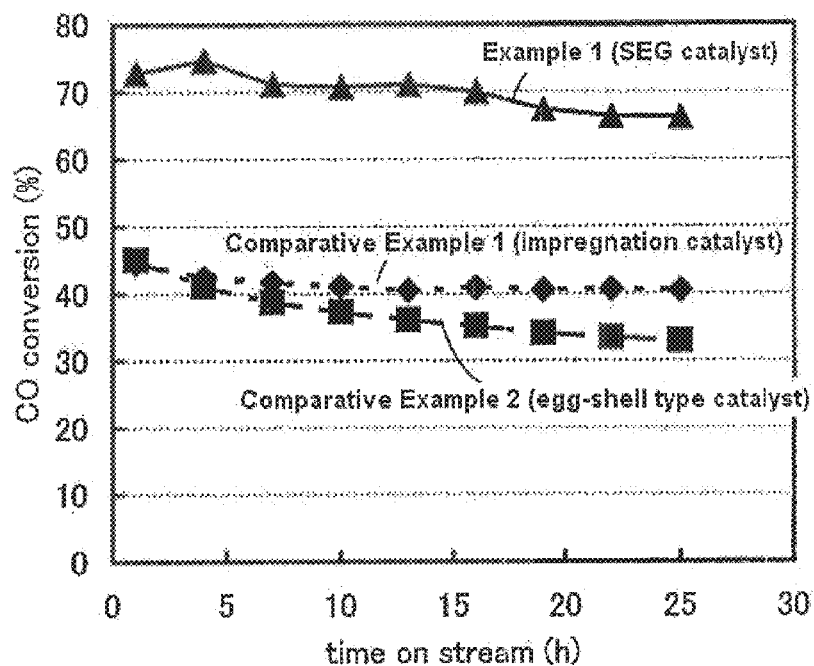
FIG. 4 is a diagram showing relationships of reaction time and carbon monoxide conversion rates of the hydrocarbon-producing catalysts of Example 1 and Comparative Examples 1 and 2 (Example 2).
Figure 5:
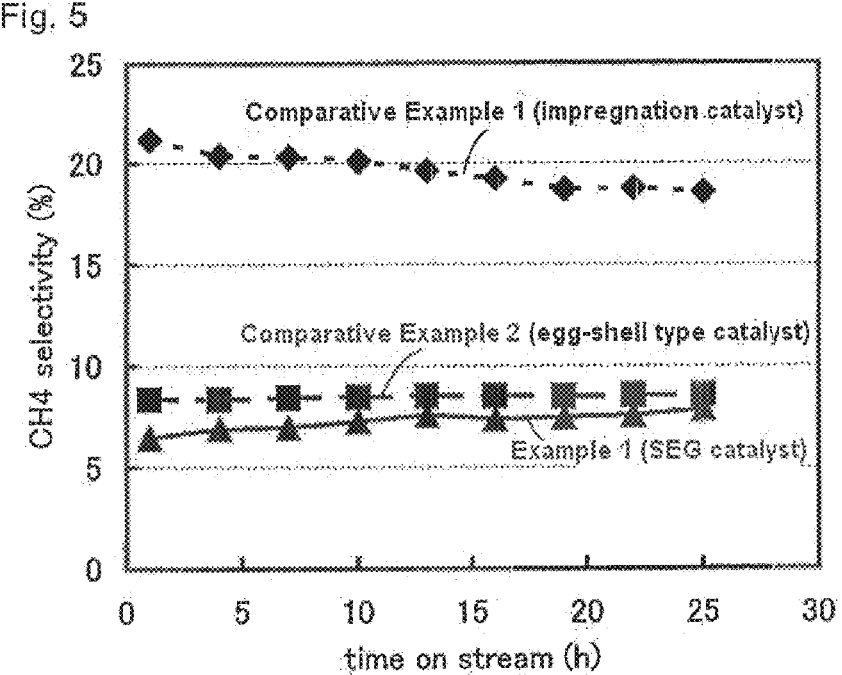
FIG. 5 is a diagram showing relationships of reaction time and methane selectivities of the hydrocarbon-producing catalysts of Example 1 and Comparative Examples 1 and 2 (Example 2).

FIG. 4 is a diagram showing relationships of reaction time and the carbon monoxide conversion rates, and FIG. 5 is a diagram showing relationships of reaction time and methane selectivities.

FIG. 4 shows that the hydrocarbon-producing catalyst of Example 1 exhibited a carbon monoxide conversion rate of no less than 70% 1 to 3 hours after the start of reaction and maintained a high conversion rate of no less than 65% even 10 hours later.

On the other hand, with each of the hydrocarbon-producing catalysts of Comparative Example 1 and Comparative Example 2, the carbon monoxide conversion rate was only approximately 50% even at only 1 hour after the start of reaction and decreased rapidly to approximately 40% after 5 hours of reaction.

It has thus become clear that the hydrocarbon-producing catalyst of the present example is high in the rate of conversion of carbon monoxide to hydrocarbon (no less than 70%) and can express a high activity for a long time. Although with the FT synthesis reaction, it is known that normally a catalyst of high activity is also high in speed of deactivation, the hydrocarbon-producing catalyst of the preset example maintains a high conversion rate of no less than 65% (approximately 70%) even after 25 hours of reaction and was thus confirmed to be capable of maintaining a high activity over a long period. This is assumed to be due to the microscopically fine active metal being reductively precipitated on the catalyst carrier surface because the active metal is dispersed uniformly via the metal oxide at the carrier surface and is encapsulated at the atomic level inside the lattice of the metal oxide.

As shown in FIG. 5, it was also confirmed that the hydrocarbon-producing catalyst of Example 1 is low in methane selectivity. Although the hydrocarbon-producing catalyst of Comparative Example 2 is also low in methane selectivity, it is not as low as that of the hydrocarbon-producing catalyst of Example 1, and it was confirmed that the methane selectivity of the hydrocarbon-producing catalyst of Comparative Example 1 is significantly high in comparison to Example 1 and Comparative Example 2.

It was thus made clear that the hydrocarbon-producing catalyst of the present example prevents the active metal from binding to the interiors of the pores of the catalyst carrier and thereby prevents a secondary reaction (conversion to methane) by active metal bound to the interiors of the pores of the catalyst carrier.

Next, hydrocarbon-producing catalysts of Example 1 and Example 2, with each of which the active metal/metal oxide molar ratio was changed, were prepared, and hydrocarbon production and evaluation of the carbon monoxide conversion rate and the methane selectivity were performed using these catalysts.

Example 3

Besides changing the amounts of the cobalt nitrate hexahydrate and tetraethoxysilane dissolved in ethylene glycol so that the molar ratio of the active metal (Co) with respect to the metal oxide ($SiO_2$) (active metal/metal oxide=Co/$SiO_2$) in the active metal carrying gel film of the hydrocarbon-producing catalyst was 1.5, a hydrocarbon-producing catalyst of Example 3 (with the average particle diameter of the catalyst carrier being 1.75 mm) was obtained in the same manner as in Example 1. The carrying rate of the active metal (cobalt) was set to 15 mass %.

Example 4

Besides changing the amounts of the cobalt nitrate hexahydrate and tetraethoxysilane dissolved in ethylene glycol so that the molar ratio of the active metal (Co) with respect to the metal oxide ($SiO_2$) (active metal/metal oxide=Co/$SiO_2$) in the active metal carrying gel film of the hydrocarbon-producing catalyst was 1.0, a hydrocarbon-producing catalyst of Example 4 (with the average particle diameter of the catalyst carrier being 1.75 mm) was obtained in the same manner as in Example 1. The carrying rate of the active metal (cobalt) was set to 15 mass %.

(Evaluation of Carbon Monoxide Conversion Rate and Methane Selectivity)

The fixed bed flow reactor was packed with 1 g of the hydrocarbon-producing catalyst of Example 3. Under the same reaction conditions as in Example 2, the gas composition at the reaction portion exit and the product oil were analyzed by gas chromatography at each raw material mixed gas supplying time and the carbon monoxide conversion rate was computed by the routine method. Also, the methane selectivity was computed from the rate of conversion to methane and the rate of conversion of carbon monoxide to hydrocarbon.

Reaction of the raw material mixed gas under the same conditions, analysis of the gas composition at the reaction portion exit and the product oil by gas chromatography at each raw material mixed gas supplying time, and computation of the carbon monoxide conversion rate and the methane selectivity were also performed for the hydrocarbon-producing catalyst of Example 4.

Figure 6:
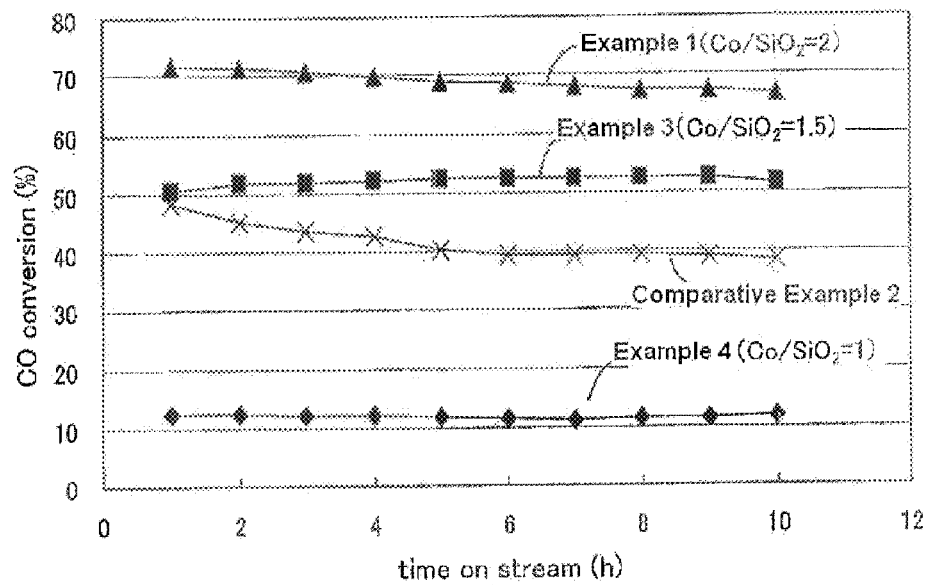
FIG. 6 is a diagram showing relationships of reaction time and carbon monoxide conversion rates of hydrocarbon-producing catalysts of Example 2, Example 3, Example 1, and Comparative Example 2.
Figure 7:
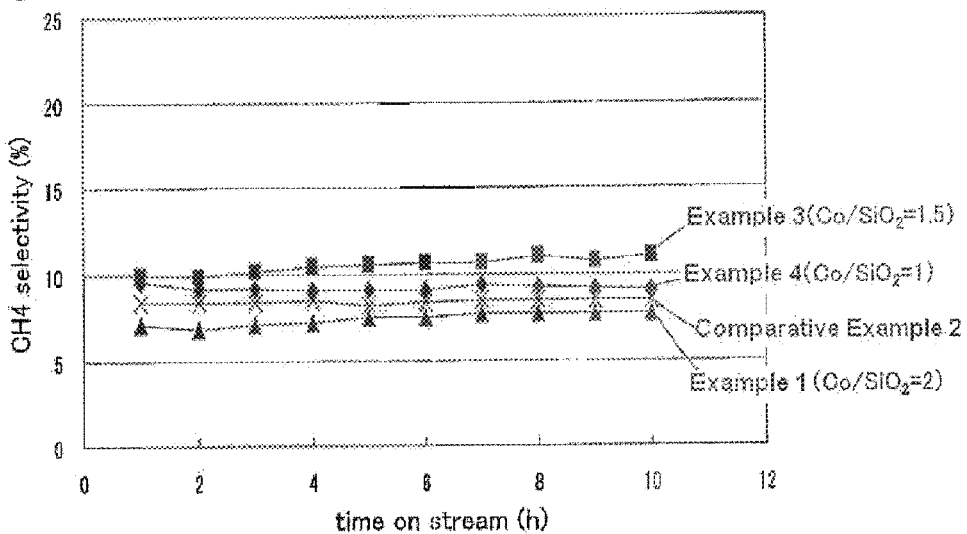
FIG. 7 is a diagram showing relationships of reaction time and methane selectivities of the hydrocarbon-producing catalysts of Example 2, Example 3, Example 1, and Comparative Example 2.

FIG. 6 is a diagram showing the relationships of the reaction time and the carbon monoxide conversion rates, and FIG. 7 is a diagram showing the relationships of the reaction time and the methane selectivities. For comparison the results of Example 1 and Comparative Example 2 are also plotted in FIG. 6 and FIG. 7.

As shown in FIG. 6, with the hydrocarbon-producing catalyst of Example 3, although the carbon monoxide conversion rate is lower than the carbon monoxide conversion rate of the hydrocarbon-producing catalyst of Example 1, the activity does not decrease as in Comparative Example 2 and a value of no less than 50% was exhibited even 10 hours after the start of reaction.

However, the carbon monoxide conversion rate of the hydrocarbon-producing catalyst of Example 4 was significantly lower than the carbon monoxide conversion rate of Comparative Example 2 and was approximately 12%. The active metal carrying rate (the proportion of the mass of the carried active metal with respect to the entire mass of the catalyst) of Example 4 is 15 mass % and the same as in Example 1 and Example 3, and it was thus assumed that the thickness of the metal oxide gel film with the active metal dispersed uniformly became thick in the hydrocarbon-producing catalyst of Example 4 due to $Co/SiO_2$ being 1.0 so that it was difficult for the active metal at a deep portion of the metal oxide gel film to reductively precipitate and the activity was thus low.

As shown in FIG. 7, the methane selectivities of the hydrocarbon-producing catalysts of Example 3 and Example 4 are slightly higher than the methane selectivity of the hydrocarbon-producing catalyst of Example 1. This is assumed to be due to the thickness of the metal oxide gel film of each of Example 3 and Example 4 being higher than that of Example 1 and the produced hydrocarbon being less likely to desorb from the active metal with the active metal at deep portions of the metal oxide gel films in these examples.

From the above, it was confirmed that when the molar ratio of the active metal (Co) with respect to the metal oxide ($SiO_2$) (active metal/metal oxide=$Co/SiO_2$) in the active metal carrying gel film is no less than 1.5, a hydrocarbon-producing catalyst that exhibits a carbon monoxide conversion rate of no less than 50% even 10 hours after the start of reaction is obtained. It was also found that when the molar ratio (active metal/metal oxide=$Co/SiO_2$) exceeds 2.4, the rate of conversion of carbon monoxide to hydrocarbon is not improved, the carried active metal decreases in utilization efficiency and becomes uneconomical, and the activity also tends to decrease readily with time.

Example 5

Next, hydrocarbon-producing catalysts of Example 5 and Example 6, with each of which the average particle diameter of the catalyst carrier was changed, were prepared, and hydrocarbon production and evaluation of the carbon monoxide conversion rate and the methane selectivity were performed using these catalysts.

Besides using silica with particle diameters of 0.85 to 1.70 mm (average pore diameter: 15 nm; average particle diameter: 1.25 mm; made by Fuji Silysia Chemical Ltd.) as the catalyst carrier, a hydrocarbon-producing catalyst of Example 5 ($Co/SiO_2$=2.0) was obtained in the same manner as in Example 1. The carrying rate of the active metal (cobalt) was set to 15 mass %.

Also, distribution and quantitative analyses of the active metal with respect to the radius direction of the catalyst were performed by electron probe microanalysis (EPMA), and the proportion of the active metal amount present within 1/10 (at an outer surface side) of the radius directed from the outer surface to the center of the hydrocarbon-producing catalyst with respect to the total active metal amount was determined to be 81%.

Example 6

Besides using silica with particle diameters of 0.075 to 0.500 mm (average pore diameter: 15 nm; average particle diameter: 0.3 mm; made by Fuji Silysia Chemical Ltd.) as the catalyst carrier, a hydrocarbon-producing catalyst of Example 6 ($Co/SiO_2$=2.0) was obtained in the same manner as in Example 1. The carrying rate of the active metal (cobalt) was set to 15 mass %.

Also, distribution and quantitative analyses of the active metal with respect to the radius direction of the catalyst were performed by electron probe microanalysis (EPMA), and the proportion of the active metal amount present within 1/10 (at an outer surface side) of the radius directed from the outer surface to the center of the hydrocarbon-producing catalyst with respect to the total active metal amount was determined to be 49%.

(Evaluation of Carbon Monoxide Conversion Rate and Methane Selectivity)

The fixed bed flow reactor was packed with 1 g of the hydrocarbon-producing catalyst of Example 5. Under the same reaction conditions as in Example 2, the gas composition at the reaction portion exit and the product oil were analyzed by gas chromatography at each raw material mixed gas supplying time and the carbon monoxide conversion rate was computed by the routine method. Also, the methane selectivity was computed from the rate of conversion to methane and the rate of conversion of carbon monoxide to hydrocarbon.

Reaction of the raw material mixed gas under the same conditions, analysis of the gas composition at the reaction portion exit and the product oil by gas chromatography at each raw material mixed gas supplying time, and computation of the carbon monoxide conversion rate and the methane selectivity were also performed for the hydrocarbon-producing catalyst of Example 6.

Figure 8:
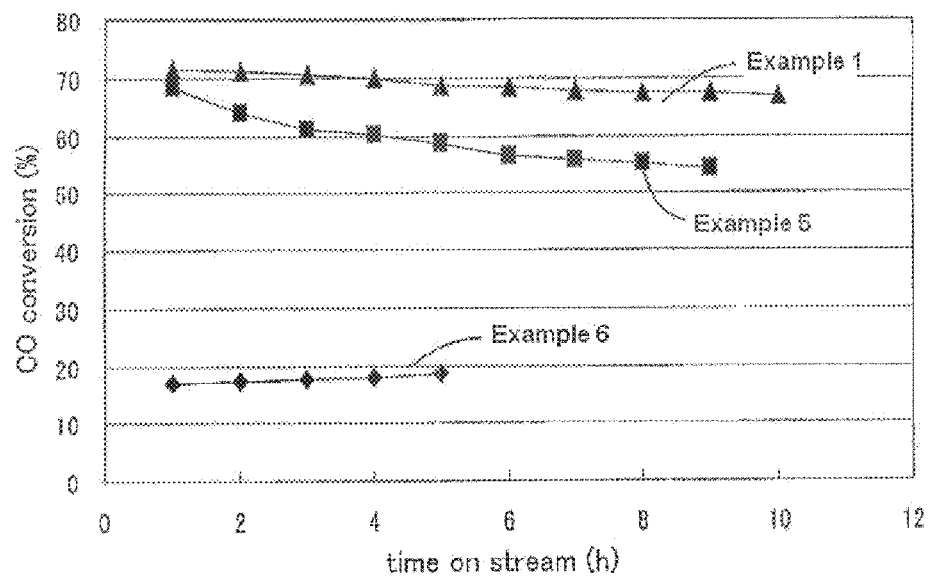
FIG. 8 is a diagram showing relationships of reaction time and carbon monoxide conversion rates of hydrocarbon-producing catalysts of Example 5, Example 6, and Example 1.
Figure 9:
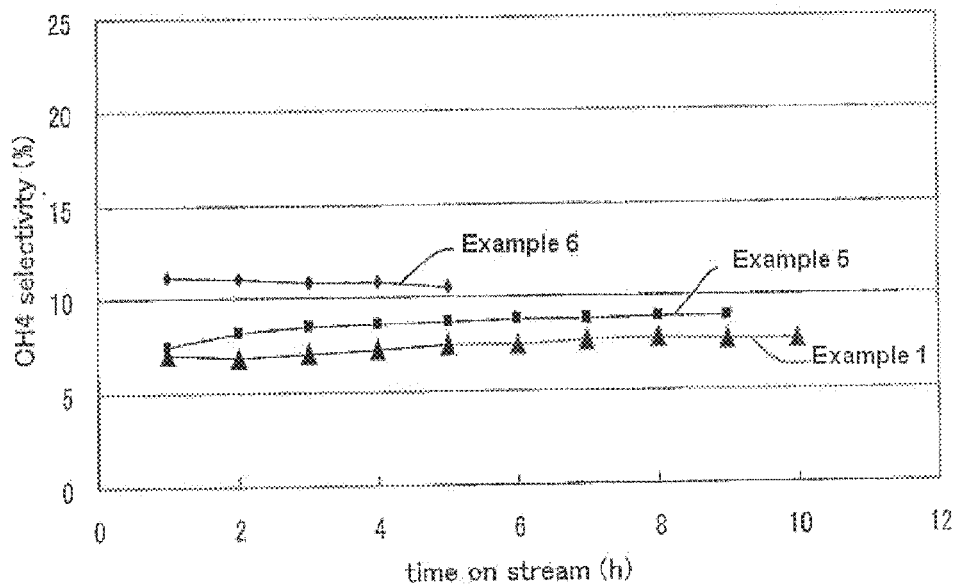
FIG. 9 is a diagram showing relationships of reaction time and methane selectivities of the hydrocarbon-producing catalysts of Example 5, Example 6, and Example 1.

FIG. 8 is a diagram showing the relationships of the reaction time and the carbon monoxide conversion rates, and FIG. 9 is a diagram showing the relationships of the reaction time and the methane selectivities. For comparison, the results of Example 1 are also plotted in FIG. 8 and FIG. 9.

The reaction was stopped at 9 hours with Example 5, the reaction was stopped at 5 hours with Example 6, and results beyond these times are thus not plotted in FIG. 8 and FIG. 9.

From FIG. 8, it was confirmed that although the carbon monoxide conversion rate of the hydrocarbon-producing catalyst of Example 5 was approximately 70% 1 hour after the start of reaction, a decrease rate thereof was greater than that of the hydrocarbon-producing catalyst of Example 1.

Meanwhile, the carbon monoxide conversion rate of the hydrocarbon-producing catalyst of Example 6 was no more than 20%.

Also, FIG. 9 shows that the methane selectivities of the hydrocarbon-producing catalysts of Example 5 and Example 6 are slightly higher than the methane selectivity of the hydrocarbon-producing catalyst of Example 1.

From the above, it was confirmed that given that the molar ratio of the active metal (Co) with respect to the metal oxide ($SiO_2$) (active metal/metal oxide=$Co/SiO_2$) in the active metal carrying gel film is the same, the rate of conversion of carbon monoxide to hydrocarbon tends to decrease as the particle diameter of the catalyst carrier decreases. This indicates that as the particle diameter of the catalyst carrier decreases, a heat capacity of each individual catalyst carrier decreases, and thus the catalyst carrier is readily cooled by the solution put in contact with the heated catalyst carrier, thereby causing the evaporation rate of the solution to be slow, the solution to readily impregnate the catalyst carrier, and thus making the properties of the catalyst approach the properties of the catalyst prepared by the conventional impregnation method.

Although with the present examples, cases where silica is used as the catalyst carrier, tetraethoxysilane is used as the metal oxide precursor, and cobalt is used as the active metal were described, the present invention is not restricted thereto, and it has been confirmed that even in cases where alumina, titania, magnesia, or zirconia is used as the catalyst carrier and titanium butoxide, zirconium propoxide, aluminum butoxide or other metal alkoxide is used as the metal oxide precursor, the carbon monoxide conversion rate of the hydrocarbon-producing catalyst obtained is high and the same tendencies are obtained. Also, in a case where iron is used as the active metal, although the activity of the catalyst is lower than in the case where cobalt is used as the active metal, it has been confirmed that given the same type of active metal, the catalyst produced by the method of the present invention is higher in activity than catalysts produced by the methods disclosed in Patent Literature 1 and Patent Literature 3.

INDUSTRIAL APPLICABILITY

The present invention relates to a method for producing a hydrocarbon-producing catalyst for producing a hydrocarbon from carbon monoxide, the hydrocarbon-producing catalyst, and a method for producing hydrocarbon, and can provide a method for producing a hydrocarbon-producing catalyst with which the rate of conversion of carbon monoxide to hydrocarbon is high, the methane selectivity is low, the high activity can be maintained over a long period, the desorption of the active metal is unlikely to occur, and the durability is excellent, and can also provide a hydrocarbon-producing catalyst with which the rate of conversion of carbon monoxide to hydrocarbon is high, the methane selectivity is low, the high activity can be maintained over a long period, the desorption of the active metal is unlikely to occur, and the durability is excellent, and further provide a method for producing hydrocarbon that can reduce the amount of methane returned as an unreacted part to the raw material side, and is excellent in productivity.

REFERENCE SIGNS LIST

1 Hydrocarbon-producing catalyst
2 Catalyst carrier
3 Pore
4 Metal oxide gel film with active metal uniformly dispersed
5 Metal oxide
6 Active metal
7 Active metal compound
8 Metal oxide precursor
9 Solvent
10 Sol solution
11 Precursor film

The invention claimed is:

1. A method for producing a hydrocarbon-producing catalyst, the method comprising:
    putting a sol solution of an active metal compound and a metal oxide precursor in contact with a heated catalyst carrier, to form a precursor film on a surface of the catalyst carrier; and
    gelling the precursor film by hydrolysis, to form a metal oxide gel film, with the active metal dispersed uniformly, on the surface of the catalyst carrier,
    wherein a molar ratio of the active metal with respect to the metal oxide, active metal/metal oxide, in the metal oxide gel film with the active metal dispersed uniformly, is 1.5 to 2.4.

2. The method of claim 1, wherein the active metal is cobalt.

3. A method for producing a hydrocarbon, the method comprising:
    reacting carbon monoxide and hydrogen in the presence of the hydrocarbon-producing catalyst obtained by the method of claim 1.

4. A method for producing a hydrocarbon, the method comprising:
    reacting carbon monoxide and hydrogen in the presence of a hydrocarbon-producing catalyst obtained by the method of claim 2.

* * * * *

UNITED STATES PATENT AND TRADEMARK OFFICE
CERTIFICATE OF CORRECTION

| | | |
|---|---|---|
| PATENT NO. | : 8,822,369 B2 | Page 1 of 1 |
| APPLICATION NO. | : 13/130882 | |
| DATED | : September 2, 2014 | |
| INVENTOR(S) | : Xiaohong Li et al. | |

It is certified that error appears in the above-identified patent and that said Letters Patent is hereby corrected as shown below:

On the title page, Item (73), Assignee's city of residence spelled incorrectly. Item (73) should read:

--(73) Kitakyushu Foundation for the Advancement of Industry, Science and Technology, Kitakyushu-shi (JP)--

Signed and Sealed this
Twenty-third Day of December, 2014

Michelle K. Lee
*Deputy Director of the United States Patent and Trademark Office*